United States Patent
Zhang et al.

(10) Patent No.: US 12,166,733 B2
(45) Date of Patent: Dec. 10, 2024

(54) INFORMATION DISPLAY METHOD AND APPARATUS, AND ELECTRONIC DEVICE

(71) Applicant: BEIJING ZITIAO NETWORK TECHNOLOGY CO., LTD., Beijing (CN)

(72) Inventors: Xin Zhang, Beijing (CN); Yafeng Miao, Beijing (CN); Hengyou Cai, Beijing (CN); Lun Li, Beijing (CN); Zeyao Yuan, Beijing (CN); Yanqing Wang, Beijing (CN); Lingwei Meng, Beijing (CN); Dandan Zhu, Beijing (CN); Wenjing Duan, Beijing (CN); Hongye Qi, Beijing (CN); Xianliang Li, Beijing (CN); Hongying Lu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/346,633

(22) Filed: Jul. 3, 2023

(65) Prior Publication Data
US 2023/0353515 A1 Nov. 2, 2023

Related U.S. Application Data

(63) Continuation of application No. PCT/CN2021/143732, filed on Dec. 31, 2021.

(30) Foreign Application Priority Data

Jan. 5, 2021 (CN) .......................... 202110011164.4

(51) Int. Cl.
G06F 15/16 (2006.01)
H04L 51/04 (2022.01)
H04L 51/214 (2022.01)

(52) U.S. Cl.
CPC ............ *H04L 51/04* (2013.01); *H04L 51/214* (2022.05)

(58) Field of Classification Search
CPC .............................. H04L 51/04; H04L 51/214
(Continued)

(56) References Cited

U.S. PATENT DOCUMENTS 9,270,711 B1 * 2/2016 Rowland ................. H04L 12/18
2003/0028601 A1 2/2003 Rowe
(Continued)

FOREIGN PATENT DOCUMENTS

CN 108848122 A 11/2018
CN 109379271 A 2/2019
(Continued)

OTHER PUBLICATIONS

Joh, Jason. "Implementing a survey with Outlook actionable messages and Office 365 Group connectors". Sep. 19, 2017. pp. 1-21. (Year: 2017).*
(Continued)

*Primary Examiner* — Imad Hussain
(74) *Attorney, Agent, or Firm* — Astute IP Law Group (57) ABSTRACT

An information display method, an information display apparatus, and an electronic device are provided. The information display method includes: acquiring a first interactive message card forwarded by a first terminal device, where the first interactive message card displayed by the first terminal device includes a data submission control element used to collect user data in response to an user interaction operation and send the collected user data to another electronic device; generating a second interactive message card based on the first interactive message card, where a data submission control element in the second interactive message card does (Continued)

not have a data collection function; and displaying the second interactive message card.

20 Claims, 9 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2009/0031393 A1* | 1/2009 | Denner | G06Q 10/00 726/1 |
| 2010/0239081 A1 | 9/2010 | Krantz et al. | |
| 2015/0339043 A1 | 11/2015 | Beaven et al. | |
| 2018/0091458 A1* | 3/2018 | Goyal | H04L 51/18 |
| 2018/0123997 A1 | 5/2018 | Celedonia et al. | |
| 2019/0222540 A1 | 7/2019 | Relangi et al. | |

FOREIGN PATENT DOCUMENTS

| | | |
|---|---|---|
| CN | 110489195 A | 11/2019 |
| CN | 110661694 A | 1/2020 |
| CN | 110888707 A | 3/2020 |
| CN | 111277487 A | 6/2020 |
| CN | 111444139 A | 7/2020 |
| CN | 111510557 A | 8/2020 |
| CN | 111796745 A | 10/2020 |
| CN | 112737927 A | 4/2021 |
| JP | 2003216556 A | 7/2003 |
| JP | 2003223251 A | 8/2003 |
| JP | 2007047911 A | 2/2007 |
| JP | 2020187402 A | 11/2020 |

OTHER PUBLICATIONS

Banh, Shally. "Create polls in email quickly and easily". Jul. 2, 2020. pp. 1-3. (Year: 2020).*
Wagh, Priyesh. "Adaptive Cards for Teams to collect data from users using Power Automate | SharePoint Lists". Jul. 20, 2020. pp. 1-14. (Year: 2020).*
Wagh, Priyesh. "Adaptive Cards for Outlook Actionable Messages using Power Automate | Power Platform". Nov. 23, 2020. pp. 1-20. (Year: 2020).*
"Action isEnabled property #4670". Oct. 6, 2021. pp. 1-4. (Year: 2021).*
"Sample: Disable Adaptive Cards after submit/obsoleted #1427". Jan. 11, 2023. pp. 1-8. (Year: 2023).*
International Search Report and Written Opinion; International Patent Application No. PCT/CN2021/143732; International Patent Application No. PCT/CN2021/143732; Apr. 1, 2022; with English translation of Search Report (11 pages).
Office Action issued in Chinese Patent Application No. 202110011164.4; Jan. 14, 2022; with English translation (18 pages).
Notice of Grant issued in Chinese Patent Application No. 202110011164.4; Jan. 13, 2023 (4 pages).
Decision to Grant for Japanese Patent Application No. 2023-540879, mailed on Aug. 27, 2024, 5 pages.

* cited by examiner

INFORMATION DISPLAY METHOD AND APPARATUS, AND ELECTRONIC DEVICE

CROSS REFERENCE OF RELATED APPLICATION

The present application is a continuation application of International Patent Application No. PCT/CN2021/143732, titled "INFORMATION DISPLAY METHOD AND APPARATUS, AND ELECTRONIC DEVICE", filed on Dec. 31, 2021, which claims priority to Chinese Patent Application No. 202110011164.4, titled "INFORMATION DISPLAY METHOD AND APPARATUS, AND ELECTRONIC DEVICE", filed on Jan. 5, 2021 with the China National Intellectual Property Administration, both of which are incorporated herein by reference in their entireties.

FIELD

The present disclosure relates to the field of internet technology, in particular to an information display method, an information display apparatus, and an electronic device.

BACKGROUND

With the development of the Internet, more and more users use terminal devices for information exchange. In some application scenarios, users can use communication software installed on terminal devices to send various types of messages, such as text messages, media information (such as images, videos, audios), or message cards.

Message cards refer to messages sent by users in the form of cards. The cards can be used to display rich content in a structured manner by combining images, formatting text, and using a graphic and textual layout. In some cases, interactive components such as buttons and selectors are added to the cards to perform simple interactive operations, such as jumping between pages, and information collection.

SUMMARY

This summary is provided to introduce concepts in a simplified form. These concepts will be described in detail in the following detailed description. This summary is neither intended to identify key features or essential features of the claimed technical solution, nor intended to limit the scope of the claimed technical solution.

In a first aspect, an information display method is provided according to embodiments of the present disclosure, including: acquiring a first interactive message card forwarded by a first terminal device, where the first interactive message card displayed by the first terminal device includes a data submission control element used to collect user data in response to an user interaction operation and send the collected user data to another electronic device; generating a second interactive message card based on the first interactive message card, where a data submission control element in the second interactive message card does not have a data collection function; and displaying the second interactive message card.

In a second aspect, an information display apparatus is provided according to embodiments of the present disclosure, including: an acquisition unit, configured to acquire a first interactive message card forwarded by a first terminal device, where the first interactive message card displayed by the first terminal device includes a data submission control element used to collect user data in response to an user interaction operation and send the collected user data to another electronic device; a generation unit, configured to generate a second interactive message card based on the first interactive message card, where a data submission control element in the second interactive message card does not have a data collection function; and a display unit, configured to display the second interactive message card.

In a third aspect, an electronic device is provided according to embodiments of the present disclosure, including: one or more processors; and a memory configured to store one or more programs, where the one or more programs, when being executed by the one or more processors, cause the one or more processors to perform the method according to the first aspect.

In a fourth aspect, a computer-readable storage medium is provided according to embodiments of the present disclosure, storing a computer program, where the program, when being executed by a processor, causes the processor to perform the method according to the first aspect.

With the information display method, the information display apparatus and the electronic device provided in embodiments of the present disclosure, the first terminal device forwards an interactive message card to the executing entity, and the executing entity acquires the interactive message card forwarded by the first terminal device, and displays the interactive message card. Thus, new means for processing a message is provided, through which users can forward interactive message cards. Thus, the efficiency of information exchange between users can be improved. It should be noted that, when the interactive message card forwarded from the first terminal device and retaining the data submission control element is received, the above executing entity cannot use the data submission control element in the interactive message card to submit data. In this way, on one hand, the integrity of the card information can be ensured, and on the other hand, it can prevent unauthorized user from submitting data, ensuring that the data received by the data receiver is submitted by users having data submission permissions, thereby improving the accuracy of the data received by the receiver.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these embodiments are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments". Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative but not restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

Figure 1:
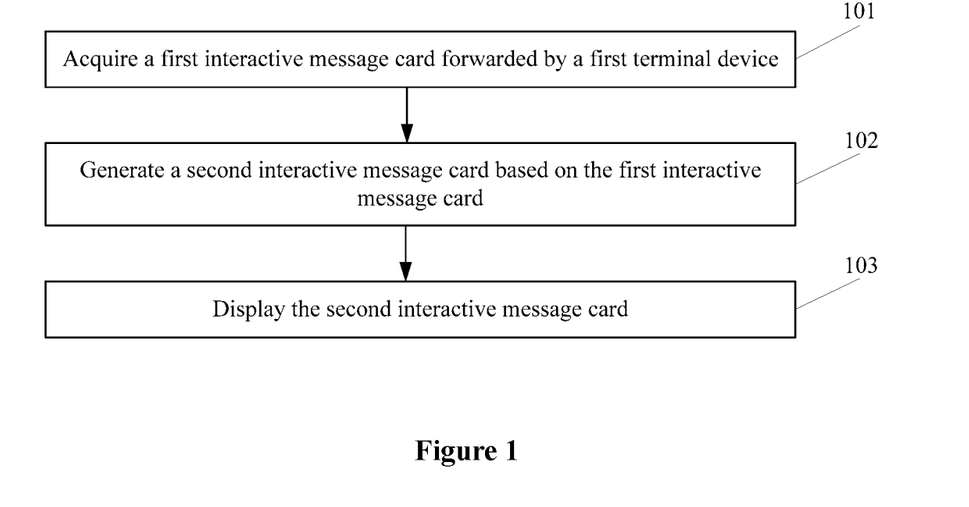
FIG. 1 is a flowchart of an information display method according to an embodiment of the present disclosure.

Reference is made to FIG. 1, which is a flowchart of an information display method according to an embodiment of the present disclosure. This information display method is applied to a terminal device. The information display method shown in FIG. 1 includes the following steps S101 to S103.

In step 101, a first interactive message card forwarded by a first terminal device is acquired.

In this embodiment, the executing entity (such as a terminal device) of the information display method acquires the first interactive message card forwarded by the first terminal device.

In this embodiment, the first interactive message card displayed by the first terminal device is used to collect user data in response to a user interaction operation and send the collected user data to another electronic device.

The first interactive message card displayed by the first terminal device may include a data submission control element.

The data submission control element may be used to collect user data in response to a user interaction operation and send the collected user data to another electronic device.

The data submission control element may be in various forms. For example, the data submission control element may include but not limited to at least one of the following: a selection control element, an input control element, a submission confirming control element. The input control is used to receive user input. The submission confirming control element is used to confirm submission of user data to another electronic device after a user selects or inputs the user data.

The user data may be interactive data generated based on user actions. These interactive data may respond to some questions or expectations shown in the interactive message card.

The operation that first terminal device forwards the first interactive message card may include: the first terminal device receives the first interactive message card from another electronic device, displays the first interactive message card, and then sends the first interactive message card to an electronic device such as the execution subject mentioned above.

Figure 2:
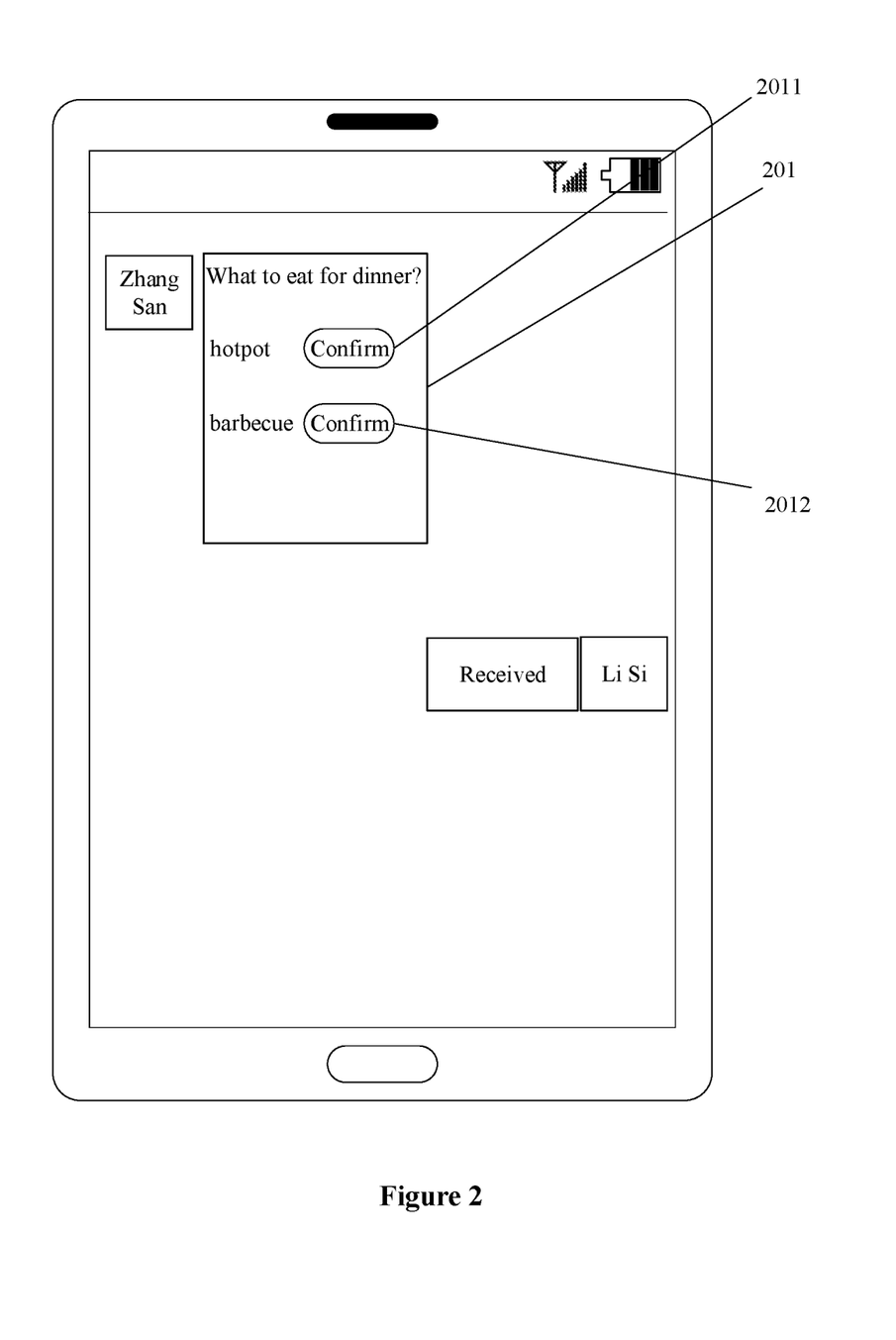
FIG. 2 is a schematic diagram of an application scenario of an information display method according to the present disclosure.

As an example, FIG. 2 shows a schematic diagram of the first interactive message card displayed by the first terminal device.

In FIG. 2, the first interactive message card 201 is displayed in a message display interface of the first terminal device. In the first interactive message card 201, a data submission control element 2011 and a data submission control element 2012 are provided. The data submission control elements can respond to user actions.

In the scenario shown in FIG. 2, Li Si receives a message sent by Zhang San, which is presented in the form of interactive message card. After receiving the first interactive message card sent by Zhang San, Li Si replies "Received".

In FIG. 2, the first interactive message card sent by Zhang San is used to collect data from Li Si (whether to have hotpot or barbecue for dinner). In the first interactive message card 201 sent by Zhang San, Li Si can click on the data submission control element 2011 or the data submission control element 2012 to choose the dinner he wants. If Li Si clicks on the data submission control element 2011, the terminal device used by Li Si may, in response to the user action, submit the data indicating that Li Si chooses hotpot to another electronic device.

Optionally, Zhang San can be a human user or a group assistant account. For example, a human user may use a group assistant account of a social group to generate and send the first interactive message card.

In the application scenario shown in FIG. 2, Li Si may forward the first interactive message card 201 to Wang Wu. In this case, the terminal device used by Wang Wu can be understood as the executing entity mentioned above.

In step 102, a second interactive message card is generated based on the first interactive message card.

In this embodiment, the above executing entity generates a second interactive message card based on the first interactive message card.

The second interactive message card includes a data submission control element that does not have a data collection function.

In some application scenarios, a second interactive message card is generated based on the first interactive message card by an electronic device such as a server. The execution subject acquires the second interactive message card sent by the electronic device such as the server. The execution subject displays the second interactive message card generated based on the first interactive message card, which can be understood as that the second interactive message card is first generated and then displayed (reproduction can also be interpreted as generation).

In some application scenarios, the step 102 of generating the second interactive message card may be executed by a server or the terminal device. If the step 102 is executed by the server, the above execution subject includes the server and the terminal device.

Step 103, the second interactive message card is displayed.

In this embodiment, the above executing entity displays the interactive message card.

Figure 3:
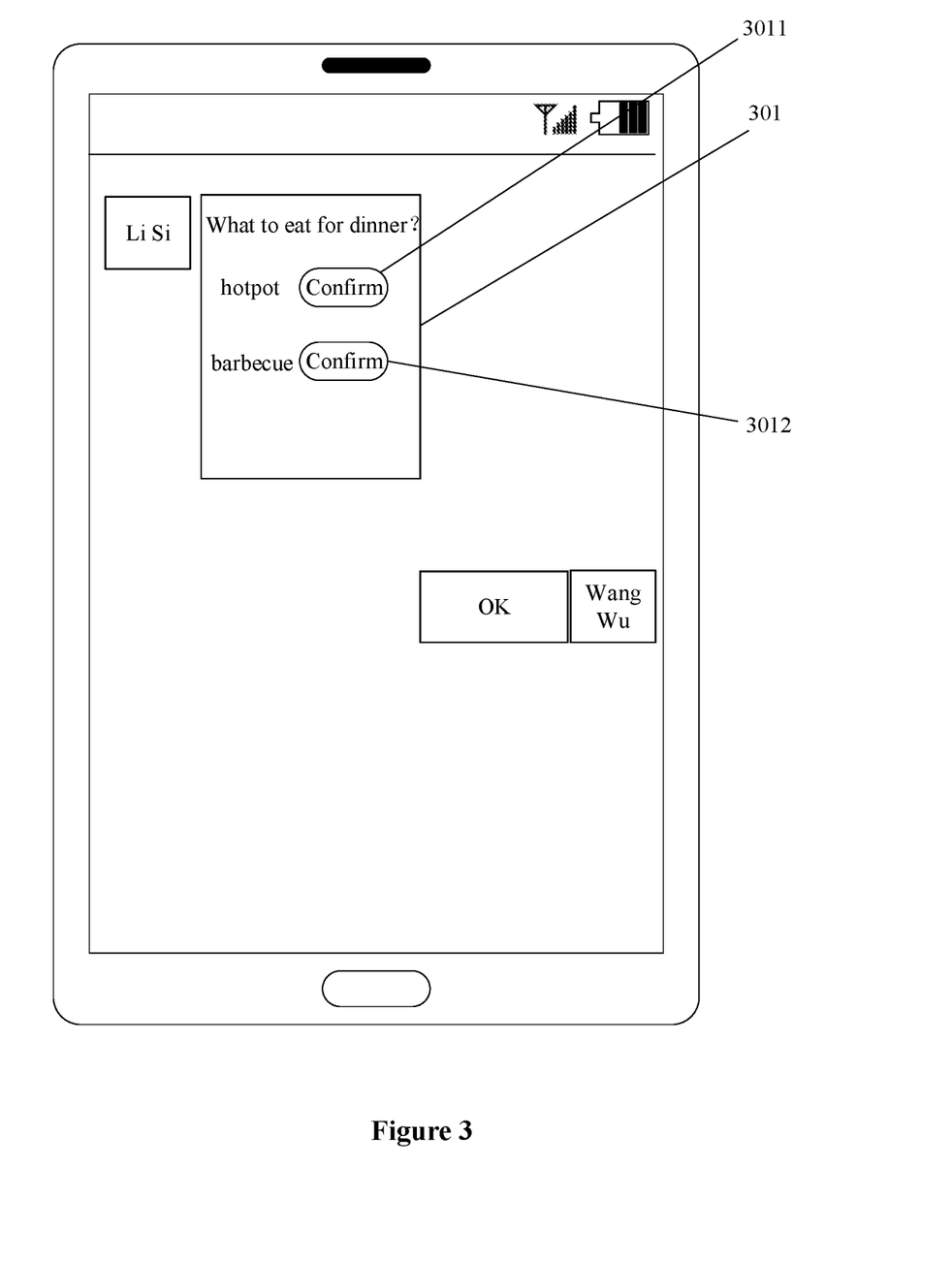
FIG. 3 is a schematic diagram of an application scenario of an information display method according to the present disclosure.

As an example, FIG. 3 shows a schematic diagram of the second interactive message card displayed by the execution subject (for example, the terminal device used by Wang Wu) mentioned above.

In FIG. 3, the second interactive message card 301 is displayed in a message display interface of the execution subject.

In the scenario shown in FIG. 3, Wang Wu receives the second interactive message card forwarded by Li Si. After receiving the second interactive message card forwarded by Li Si, Wang Wu may reply "OK".

The interactive message cards shown in FIG. 2 and FIG. 3 are compared below.

The data submission control element 2011 and the data submission control element 2012 in FIG. 2 are used to collect user data. The data submission control element 3011 in FIG. 3 comes from the data submission control element 2011 in FIG. 2, and the data submission control element 3012 in FIG. 3 comes from the data submission control element 2012 in FIG. 2. However, the data submission control element 3011 and the data submission control element 3012 do not have the data collection function.

In other words, the data submission control element 2011 can respond to a user interaction operation, collect user data, and submit user data. The data submission control element 3011 does not have the function of collecting user data, and thus does not have the function of submitting user data. However, the data submission control element may have the function of responding to a user interaction operation. Similarly, the data submission control element 3012 does not have the function of collecting user data.

In some embodiments, the data submission control element in the second interactive message card may be displayed in a different way from the data submission control element in the first interactive message card. This difference in displaying the data submission control elements can be designed according to actual application scenarios, which is not limited herein.

As an example, the data submission control element in the second interactive message card may be grayed, so as to indicate that the function of the data submission control element in the second interactive message card is unavailable (i.e., the data submission function is disabled). The data submission control element in the first interactive message card is not grayed, so as to indicate that the function of the data submission control element in the first interactive message card is available.

It should be noted that, in the information display method provided in this embodiment, the first terminal device forwards an interactive message card to the executing entity, and the executing entity acquires the interactive message card forwarded by the first terminal device, and displays the interactive message card. Thus, new means for processing a message is provided, through which users can forward interactive message cards. Thus, the efficiency of information exchange between users can be improved.

The scenario in FIG. 3 is taken as an example to illustrate the above technical effect (improving information exchange efficiency between users). If Wang Wu asks Li Si what to eat for the dinner, Li Si can forward the received interactive message card to Wang Wu. The information that Wang Wu can obtain from this card includes: Li Si has participated in the dinner discussion, and Li Si has chosen hotpot or barbecue (if Li Si has already chosen) or may not want to eat hotpot or barbecue (if Li Si did not choose). In the case of not supporting the forwarding of the interactive message card, Li Si needs to input his own voice or text message to tell Wang Wu whether he already has a dinner choice, what he chose, or whether he is dissatisfied with the existing choices (hotpot and barbecue).

It can be seen that Li Si forwards the interactive message card to Wang Wu, using the interactive message card as a carrier for information exchange. Compared with Li Si sending his input voice or text message to Wang Wu, the forwarding operation is simpler and conveys a larger amount of information. Therefore, the efficiency of information exchange between users can be improved.

It should be noted that the above executing entity, when receiving the interactive message card forwarded from the first terminal device, cannot use the data submission control element in the interactive message card to submit data. On one hand, the data submission control element is retained to ensure the integrity of the card information. On the other hand, it can prevent unauthorized user from submitting data, ensuring that the data received by the data receiver is submitted by users having data submission permissions, thereby improving the accuracy of the data received by the receiver.

In some embodiments, the method further includes displaying prompt information in response to a detected triggering operation on the data submission control element in the second interactive message card.

The prompt information may be used to prompt that the second interactive message card does not have the data collection function.

Figure 4:
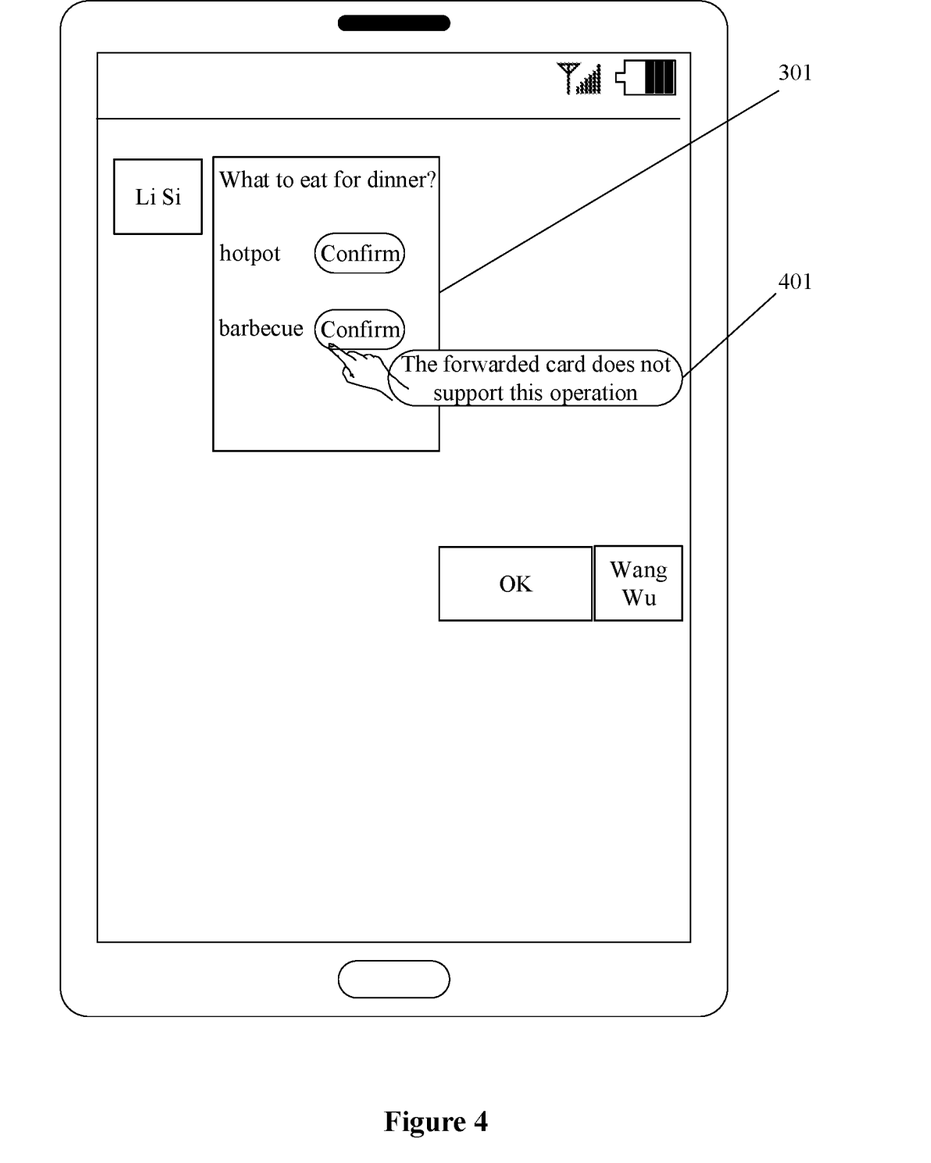
FIG. 4 is a schematic diagram of an application scenario of an information display method according to the present disclosure.

Reference is made to FIG. 4, which is a schematic diagram of the prompt information.

In FIG. 4, Wang Wu may click on the confirmation button corresponding to the barbecue in the interactive message card 301. Then, the terminal device may display a control element 401 showing the text "The forwarded card does not support this operation" to prompt Wang Wu that this card does not have the data submission function.

In some embodiments, the first interactive message card may include a request control element for sending a data acquisition request. The second interactive message card may also include the request control element.

Figure 5:
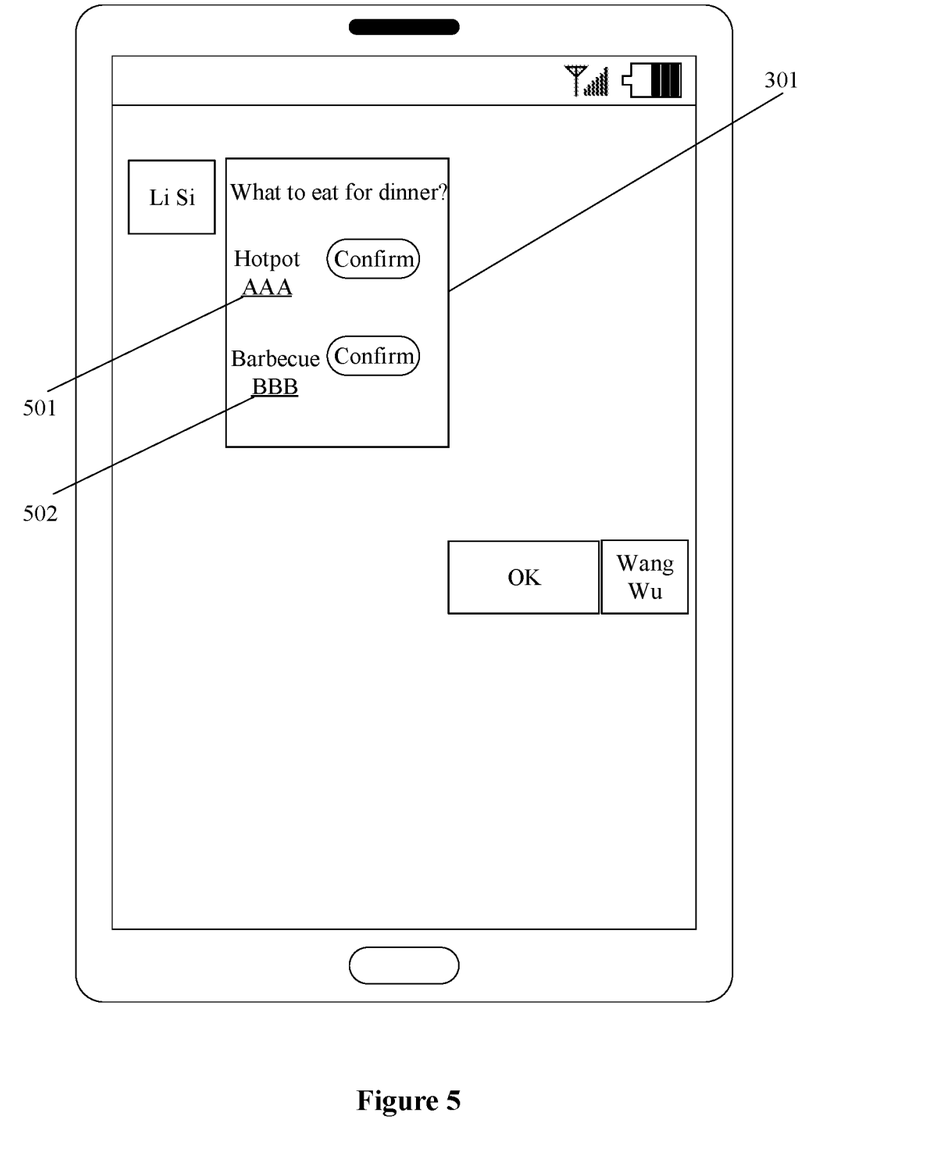
FIG. 5 is a schematic diagram of an application scenario of an information display method according to the present disclosure.

Reference is made to FIG. 5, which illustrates a request control element 501 and a request control element 502. The request control element 501 may be a link to an introduction page of a hotpot restaurant. The request control element 502 may be a link to an introduction page of a barbecue shop.

In some embodiments, the method may further include sending the data acquisition request in response to a detected triggering operation on the request control element in the second interactive message card.

In the scene shown in FIG. 5, Wang Wu may click on the request control element 501 or the request control element 502 to access the introduction page of the hotpot shop or the introduction page of the barbecue shop.

It should be noted that for the request control element in the first interactive message card, the function of the request control element is retained in the second interactive message card. Thus, more information (i.e., information that is not presented on the second interactive message card) can be obtained through the second interactive message card, thereby improving the efficiency of information acquisition.

In some embodiments, the method may further include forwarding the second interactive message card in response to a detected forwarding operation on the second interactive message card.

The second interactive message card can be forwarded multiple times.

As an example, in the application scenario shown in FIG. 3, after receiving the interactive message card sent by Li Si, Wang Wu can forward the received interactive message card to Zhao Liu, for example.

It should be noted that the interactive message card received by the above executing entity can be forwarded again, which can achieve rapid spread of the message, thereby improving information spreading efficiency.

In some embodiments, the first terminal device forwards at least two messages.

In some application scenarios, the first terminal device forwards the messages in a package to another electronic device, or forwards the messages one by one to another electronic device.

In some embodiments, the at least two messages forwarded by the first terminal device include at least one first interactive message card.

In some embodiments, step 103 of displaying the second interactive message card may include displaying at least two messages including the first interactive message card.

It should be noted that the first terminal device may forward the first interactive message card along with another message (in a package or one by one). The above executing entity is capable of displaying various types of received messages. In this way, not only the operations of the first terminal device are reduced, but also the information acquisition efficiency of the executing entity is improved.

In some application scenarios, the at least two messages may include one or more interactive message cards. As an example, if at least two interactive message cards are included, the interactive message cards may be forwarded in a package or one by one.

Figure 6:
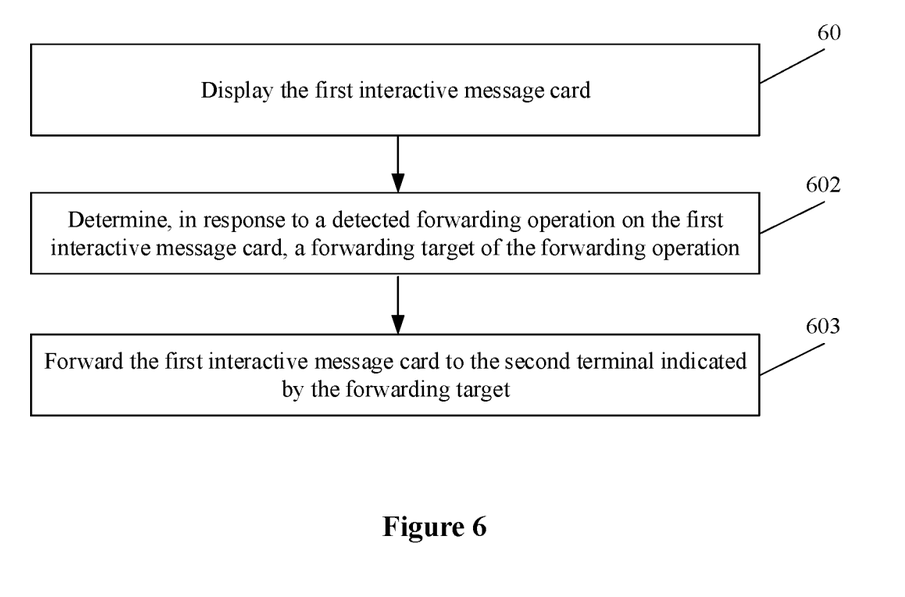
FIG. 6 is a flowchart of an information display method according to an embodiment of the present disclosure.

In some embodiments, the first terminal device forwards the first interactive message card through a forwarding step. Referring to FIG. 6, the forwarding step may include steps 601, 602 and 603.

In step 601, the first interactive message card is displayed.

Reference is made to FIG. 2, which is a schematic diagram of the first interactive message card displayed by the first terminal device.

In step 602, in response to a detected forwarding operation on the first interactive message card, a forwarding target of the forwarding operation is determined.

The forwarding operation can be achieved in various manners, which is not limited herein.

Figure 7:
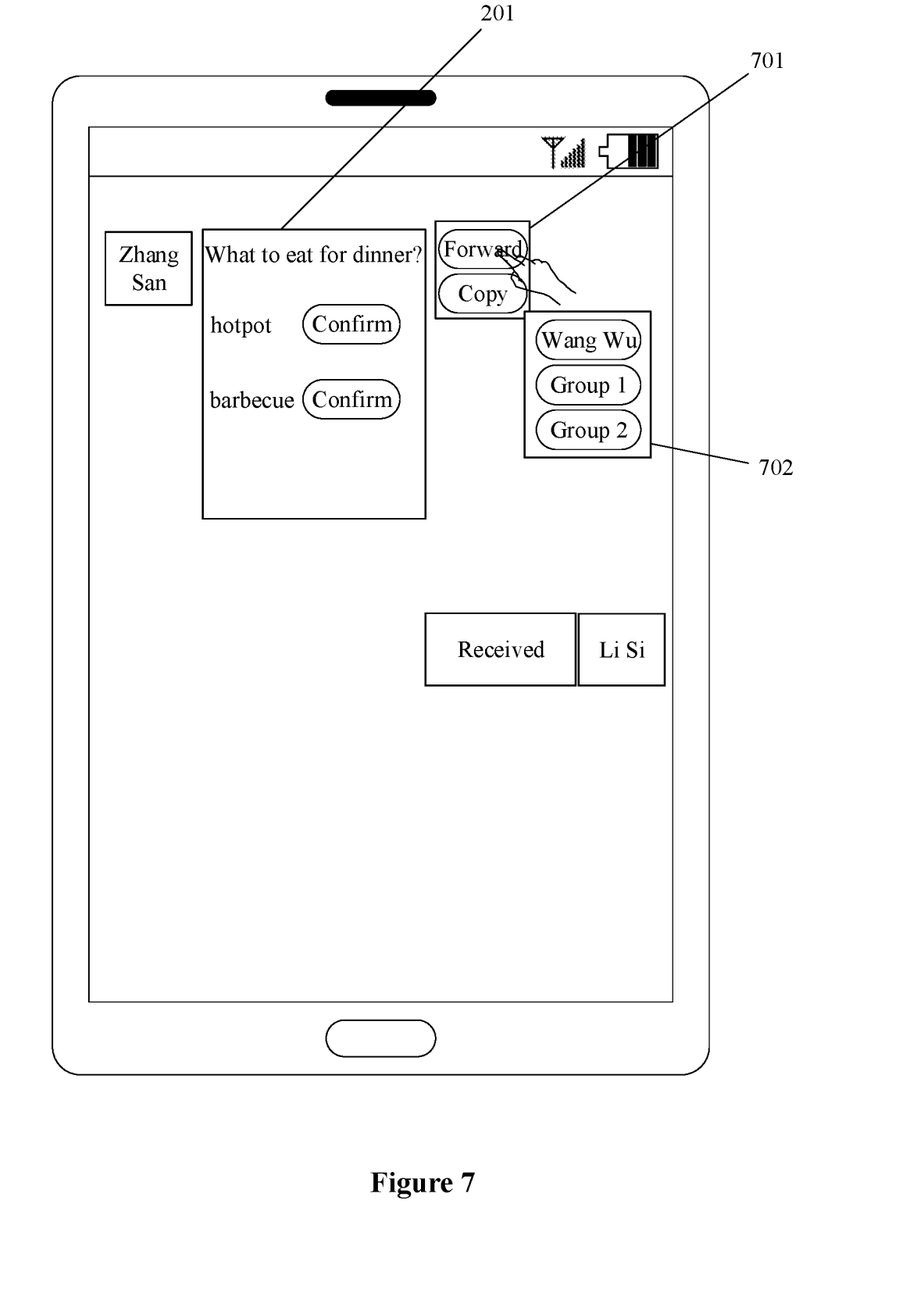
FIG. 7 is a schematic diagram of an application scenario of an information display method according to the present disclosure.

As an example, referring to FIG. 7, Li Si right-clicks in the area of the first interactive message card to evoke a control bar 701, which may display a forwarding control element 702 and a reply control element 703. Li Si may click on the forwarding control element 702 to evoke a forwarding target bar 704. The forwarding target bar may display at least one forwarding target, such as Wang Wu, Group 1, and Group 2. Li Si may select Wang Wu as the forwarding target.

In step 603, the first interactive message card is forwarded to the second terminal device indicated by the forwarding target.

Referring to the scenario shown in FIG. 7, the first terminal device may forward the first interactive message card to the second terminal device used by Wang Wu.

It should be noted that the above forwarding step of the first terminal device can achieve rapid forwarding of the first interactive message card, reduce the amount of information input by the user of the first terminal device, reduce the computational workload of the first terminal device, and improve the efficiency of information interaction between the first terminal device and the forwarding target.

In some embodiments, the first interactive message card received by the first terminal device may be generated through a generating step.

In some embodiments, the generating step may include establishing an association relationship between a forwarding parameter and the first interactive message card.

The forwarding parameter is used to indicate whether the first interactive message card is allowed to be forwarded. The forwarding parameter may be preset.

In some application scenarios, the generator of the first interactive message card may configure the forwarding parameter to indicate which cards are allowed to be forwarded and which cards are not allowed to be forwarded.

It should be noted that through the forwarding parameter, whether the first interactive message card is allow to be forwarded can be configured according to actual application scenarios.

In some embodiments, in response to determining that the first interactive message card is allowed to be forwarded, the first terminal device evokes a forwarding interactive control element based on a user operation.

If the first terminal device determines that the received first interactive message card is allowed to be forwarded, a forwarding control element is evoked based on a user operation, for the user to perform a forwarding operation. For example, when a user right-clicks on the displayed control bar, a forwarding control element is displayed.

If the first terminal device determines that the received first interactive message card is not allowed to be forwarded, the user operation cannot evoke the forwarding control element. As an example, the forwarding control element is not displayed in the control bar displayed in response to a right-click of the user.

It should be noted that the first terminal device may determine whether the received first interactive message card is allowed to be forwarded based on the forwarding parameter. If forwarding is allowed, the forwarding control element is displayed. If forwarding is not allowed, the forwarding control element is not displayed. In this way, whether the first interactive message card is allowed to be forwarded can be controlled at the forwarding source, avoiding improper forwarding of the first interactive message card. Thus, the risk of data leakage is reduced and the data security is ensured.

In some embodiments, a generating step of generating the first interactive message card may include: generating the first interactive message card by a third-party application. That is, the first interactive message card may be generated by the third-party application.

In some embodiments, a communication application having a message interaction function may be used to receive the first interactive message card generated by the third-party application.

As an example, the third-party application may generate the first interactive message card and communicate with a communication application. A user of the communication application may send the first interactive message card generated by the communication application to another user of the communication application, such as Li Si.

It should be noted that the communication application may obtain the first interactive message card generated by the third-party applications and send the first interactive message card to a user of the communication application, which can improve the efficiency of information exchange between users of the communication application.

In some embodiments, the generating step may include: evoking, in the communication application, a hosted application indicating the third-party application; and generating the first interactive message card by using the hosted application.

The hosted application indicating the third-party application may be evoked by triggering a functional control element of the communication application. The hosted application is an application hosted in the communication application, such as a third-party mini application program embedded in the communication application. The hosted application may implement some or all of the functions of the indicated third-party application.

The first interactive message card may be generated by operating the hosted application by the user.

It should be noted that using a hosted application in the communication application to generate the first interactive message card can avoid jumping to the third-party application for generating the card. As a result, the number of applications running in the terminal device can be reduced, so as to ensure a high operation speed. Furthermore, the time for starting the third-party application and jumping to third-party application can be saved. Thus, the speed of generating the card can be improved.

In some embodiments, the generating step includes: displaying, in response to evoking the hosted application, the hosted application in a sidebar popping up on an interface of the communication application.

It should be noted that displaying the hosted application in the sidebar of the interface of the communication application can facilitate user operations on the hosted application and improve the generation speed of the first interactive message card. Moreover, the area occupied by the hosted application in the interface of the communication application can be reduced, thereby improving the interface utilization rate of the communication application.

In some embodiments, the generating the first interactive message card by a third-party application may include: generating the first interactive message card by calling a card generation interface provided by a server that supports the communication application.

The server that supports the communication application may provide the card generation interface. The third-party application can easily generate a card through the card generation interface.

As an example, the server that supports the communication application may provide a card structure acquisition interface, a card element acquisition interface, a card parameter setting interface, or the like. The card structure acquisition interface can be used to obtain a framework structure of a card. The card element acquisition interface can be used to obtained card elements such as interactive control element styles. The card parameter setting interface can be used to set card parameters such as the forwarding parameter.

It should be noted that the card generation interface provided by the server that supports the communication application can provide a card generation method suitable for the communication application. In other words, the card generated by the third-party application through the card generation interface is then transmitted by the communication application, which can ensure the matching between the card and the communication application, at least avoiding the situation where the communication application cannot recognize the card.

Furthermore, the card generation interface provided by the server that supports the communication application can provide convenience for the user to generate the first interactive message card, so as to increase the possibility of the user generating and using the first interactive message card, and thus increase the possibility of using the first interactive message card for information spreading in use of the communication application, thereby improving the overall information exchange efficiency of the communication application.

Figure 8:
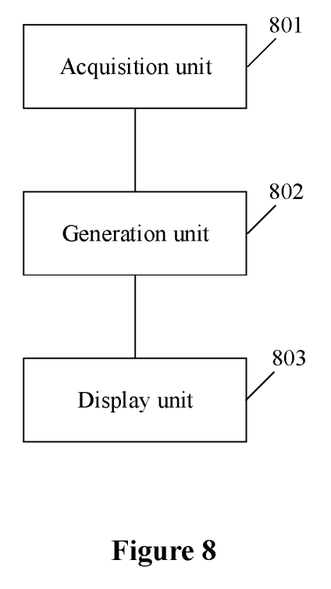
FIG. 8 is a structural schematic diagram of an information display apparatus according to an embodiment of the present disclosure.

Referring to FIG. 8, as an implementation of the methods shown in the above figures, an information display apparatus is provided according to the present disclosure, which corresponds to the method embodiment shown in FIG. 1. The device can be applied to various electronic devices.

As shown in FIG. 8, the information display apparatus of this embodiment includes: an acquisition unit 801, a generation unit 802, and a display unit 803. The acquisition unit is used to acquire a first interactive message card forwarded by a first terminal device, where the first interactive message card displayed by the first terminal device includes a data submission control element used to collect user data in response to an user interaction operation and send the collected user data to another electronic device. The generation unit is configured to generate a second interactive message card based on the first interactive message card, where a data submission control element in the second interactive message card does not have a data collection function. The display unit is configured to display the second interactive message card.

In this embodiment, for the specific processing of the acquisition unit 801, the generation unit 802, and the display unit 803 of the information display apparatus, as well as the technical effects thereof, one can refer to the relevant descriptions of steps 101, 102, and 103 in the corresponding embodiment of FIG. 1, which will not be repeated here.

According to the method claimed in claim 1, in some embodiments, the device is further configured to display prompt information in response to a detected triggering operation on the data submission control element in the second interactive message card, where the prompt information is used to prompt that the second interactive message card does not have a data submission function.

In some embodiments, the first interactive message card includes a request control element used to send a data acquisition request, and the second interactive message card includes the request control element. The apparatus is further configured to send the data acquisition request in response to a detected triggering operation on the request control element in the second interactive message card.

In some embodiments, the apparatus is further configured to forward the second interactive message card in response to a detected forwarding operation on the second interactive message card.

In some embodiments, the first terminal device forwards at least two messages, the at least two messages includes at least one first interactive message card. The displaying the second interactive message card includes: displaying the at least two messages including the first interactive message card.

In some embodiments, the first terminal device forwards the first interactive message card by a forwarding step, the forwarding step including: displaying the first interactive message card; determining, in response to a detected forwarding operation on the first interactive message card, a forwarding target of the forwarding operation; and forwarding the first interactive message card to the second terminal indicated by the forwarding target.

In some embodiments, the first interactive message card received by the first terminal device is generated by a generating step, the generating step including: establishing an association relationship between a forwarding parameter and the first interactive message card, where the forwarding parameter is used to indicate whether the first interactive message card is allowed to be forwarded, and the first terminal device receiving the first interactive message card determines whether the first interactive message card is allowed to be forwarded based on the forwarding parameter.

In some embodiments, in response to determining that the first interactive message card is allowed to be forwarded, the first terminal device evokes a forwarding interactive control element based on a user operation.

In some embodiments, a generating step for generating the first interactive message card includes: generating the first interactive message card by a third-party application, where the first interactive message card generated by the third-party application is received through a communication application having a message interaction function.

In some embodiments, the generating step includes: evoking, in the communication application, a hosted application indicating the third-party application; and generating the first interactive message card by using the hosted application.

In some embodiments, the generating step includes: displaying, in response to evoking the hosted application, the hosted application in a sidebar popping up on an interface of the communication application.

In some embodiments, the generating the first interactive message card by the third-party application includes: generating the first interactive message card by calling a card generation interface provided by a server that supports the communication application.

Figure 9:
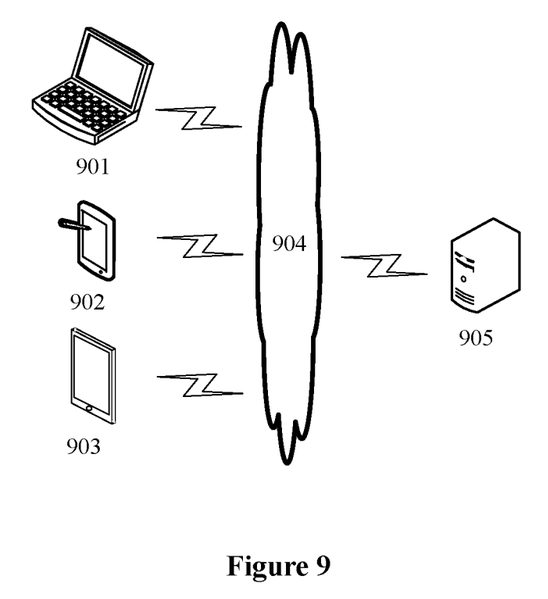
FIG. 9 is an exemplary system architecture for applying an information display method according to an embodiment of the present disclosure.

Reference is made to FIG. 9, which illustrates exemplary system architecture for applying the information display method according to an embodiment of the present disclosure.

As shown in FIG. 9, the system architecture may include terminal devices 901, 902 and 903, a network 904, and a server 905. The network 904 is a medium used to provide communication links between the terminal devices 901, 902 and 903 and the server 905. The network 904 may include various types of connection, such as wired or wireless communication links, fiber optic cables, and the like.

The terminal devices 901, 902 and 903 can communication with the server 905 through the network 904 to receive or send messages, etc. The terminal devices 901, 902 and 903 may be installed with various client applications, such as web browser applications, search applications, and news and information applications. The client applications in the terminal devices 901, 902 and 903 can receive user instructions and complete corresponding functions according to the user instructions, such as adding information according to the user instructions.

The terminal devices 901, 902, and 903 may be in form of hardware or software. When the terminal devices 901, 902 and 903 are in form of hardware, they may be various electronic devices having display screens and supporting web browsing, including but not limited to smartphones, tablets, e-book readers, MP3 (Moving Picture Experts Group Audio Layer III) players, MP4 (Moving Picture Experts Group Audio Layer IV) players, laptop and desktop computers. When the terminal devices 901, 902 and 903 are in form of software, they can be installed in the electronic devices listed above, and may be implemented as multiple software or software modules (such as software or software modules used to provide distributed services), or as a single software or software module, which is not limited herein.

The server 905 may be a server that provides various services, such as receiving information acquisition requests sent by the terminal devices 901, 902 and 903, obtaining display information corresponding to the information acquisition requests through various methods, and sending data of the display information to the terminal devices 901, 902 and 903.

It should be noted that the information display methods provided in the disclosed embodiments may be executed by the terminal device, and accordingly, the information display apparatus may be arranged in the terminal devices 901, 902, and 903. In addition, the information display methods provided in the embodiments may be executed by the server 905, and accordingly, the information display apparatus may be arranged in the server 905.

It should be understood that the numbers of the terminal devices, networks, and servers in FIG. 9 are only illustrative. The numbers of the terminal devices, networks, and servers can be configured according to actual requirements.

Figure 10:
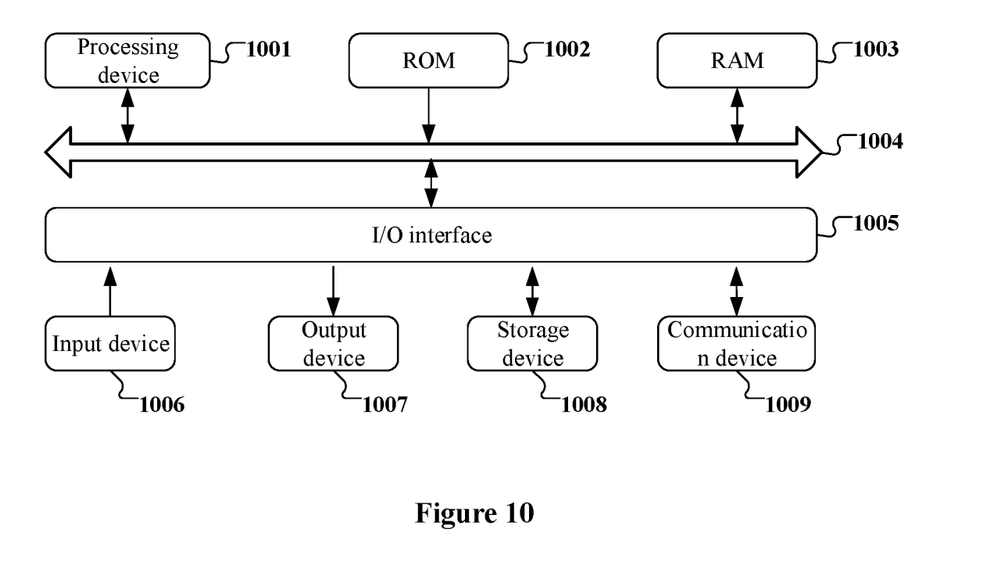
FIG. 10 is a schematic structural diagram of an electronic device according to an embodiment of the present disclosure.

Reference is made to FIG. 10, which is a schematic structural diagram of an electronic device (for example, the terminal devices or server in FIG. 9) according to an embodiment of the present disclosure. The terminal devices in the embodiments of the present disclosure may include but not limited to mobile terminals such as mobile phones, notebook computers, digital broadcast receivers, PDAs (personal digital assistants), PADs (tablet computers), PMPs (portable multimedia players) and vehicle terminals (such as car navigation terminals); and fixed terminals such as digital TVs and desktop computers. The electronic device shown in FIG. 10 is only an example, and should not limit the functions and application scope of the embodiments of the present disclosure.

As shown in FIG. 10, the electronic device may include a processing device (such as a central processing unit and a graphics processing unit) 1001. The processing device 1001 can execute various appropriate actions and processes according to programs stored in a read only memory (ROM) 1002 or loaded from a storage device 1008 into a random-access memory (RAM) 1003. In the RAM 1003, various programs and data necessary for the operation of the electronic device 1000 are also stored. The processing device 1001, the ROM 1002 and the RAM 1003 are connected to each other through a bus 1004. An input/output (I/O) interface 1005 is also connected to the bus 1004.

Generally, the following devices may be connected to the I/O interface 1005: input devices 1006 including, for example, a touch screen, a touch pad, a keyboard, a mouse, a camera, a microphone, an accelerometer, a gyroscope, etc.; output devices 1007 including, for example, a liquid crystal display (LCD), a speaker, a vibrator, etc.; a storage device 1008 including, for example, a magnetic tape, a hard disk, etc.; and a communication device 1009. The communication device 1009 may allow the electronic device 1000 to perform wireless or wired communication with other devices to exchange data. Although FIG. 10 shows the electronic device having various means, it should be understood that implementing or having all of the devices shown is not a requirement. More or fewer devices may alternatively be implemented or provided.

In particular, according to an embodiment of the present disclosure, the processes described above with reference to the flowcharts may be implemented as computer software programs. For example, embodiments of the present disclosure provide a computer program product. The computer program product includes a computer program carried on a non-transitory computer-readable medium. The computer program contains program code for carrying out the methods shown in the flowcharts. In such an embodiment, the computer program may be downloaded and installed from a network via the communication device 1009, or from the storage device 1008, or from the ROM 1002. When the computer program is executed by the processing device 1001, the functions defined in the methods of the embodiments of the present disclosure are performed.

It should be noted that the above computer-readable medium in the present disclosure may be a computer-readable signal medium or a computer-readable storage medium or any combination of the above two. The computer readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to: electrical connections with one or more wires, portable computer disks, hard disks, a random-access memory (RAM), a read only memory (ROM), an erasable programmable read-only memory (EPROM or Flash), optical fibers, a compact disk read-only memory (CD-ROM), optical storage devices, magnetic memory components, or any suitable combination of the above. In the present disclosure, the computer-readable storage medium may be any tangible medium that contains or stores a program. The program may be used by or in conjunction with the instruction execution system, apparatus or device. In the present disclosure, however, the computer-readable signal medium may include a data signal propagated in baseband or as part of a carrier wave, and the data signal carries computer-readable program code. Such propagated data signals may be in various forms, including but not limited to electromagnetic signals, optical signals, or any suitable combination of the foregoing. The computer-readable signal medium may also be any computer-readable medium other than the computer-readable storage medium. The computer-readable signal medium may transmit, propagate, or transport a program for use by or in connection with an instruction execution system, apparatus, or device. Program code embodied on the computer-readable medium may be transmitted by any appropriate medium, including but not limited to: wires, optical cables, RF (radio frequency), etc., or any suitable combination of the above.

In some embodiments, a client may communicate with a server using any currently known or future-developed network protocols such as HTTP (Hypertext Transfer Protocol), and the client and the server may be interconnected with digital data communication of any form or medium (e.g., a communication network). Examples of the communication network include local area networks ("LANs"), wide area networks ("WANs"), internetworks (e.g., the Internet), peer-to-peer networks (e.g., ad hoc peer-to-peer networks), as well as any currently known or future developed network.

The computer-readable medium may be included in the electronic device, or may exist independently without being incorporated into the electronic device.

The computer-readable medium carries one or more programs, when being executed by the electronic device, causes the electronic device to perform operations of: acquiring a first interactive message card forwarded by a first terminal device, where the first interactive message card displayed by the first terminal device includes a data submission control element used to collect user data in response to an user interaction operation and send the collected user data to another electronic device; generating a second interactive message card based on the first interactive message card, where a data submission control element in the second interactive message card does not have a data collection function; and displaying the second interactive message card.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer and partly on a remote computer or entirely on a remote computer or server. Where a remote computer is involved, the remote computer may be connected to the user computer through any kind of network including a local area network (LAN) or a wide area network (WAN), or may be connected to an external computer (e.g., via the Internet by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagram may represent a module, program segment, or portion of code. The module, program segment, or portion of code contains one or more executable instructions for implementing specified logical functions. It should also be noted that, in some alternative implementations, the functions noted in the block may occur in an order different form the order noted in the drawings. For example, two blocks shown in succession could, in fact, be executed substantially concurrently or in reverse order, depending upon the functionality involved. Further, each block in the block diagrams and/or flow charts, and a combination of blocks in the block diagrams and/or flow diagrams may be performed by a dedicated hardware-based system that performs the specified functions or operations or by a combination of dedicated hardware and computer instructions.

The units involved in the embodiments described in the present disclosure may be implemented by software or by hardware. The name of a unit does not in any way constitute a qualification of the unit itself. For example, the acquisition unit may be named as "a unit for a first interactive message card".

The functions described herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system on chips (SOCs), complex programmable logical devices (CPLDs), etc.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include one or more wire-based electrical connections, portable computer disks, hard disks, a random-access memory (RAM), a read only memory (ROM), an erasable programmable read only memory (EPROM or flash memory), fiber optics, a compact disk read-only memory (CD-ROM), optical storage devices, magnetic storage devices, or any suitable combination of the foregoing.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. An information display method, comprising:
   receiving, a first interactive message card, wherein the first interactive message card comprises a first data submission control element used to collect user data in response to a user interaction operation and send the collected user data to another device; and
   generating, a second interactive message card according to the first interactive message card, wherein a second data submission control element in the second interactive message card does not have a data collection function;
   wherein the second data submission control element is displayed as disabled mode;
   wherein interactive data on the second interactive message card is generated based on user actions on the first interactive message card.

2. The information display method according to claim 1, further comprising:
   displaying prompt information in response to a detected triggering operation on the data submission control element in the second interactive message card, wherein the prompt information is used to prompt that the second interactive message card does not have a data submission function; or
   forwarding the second interactive message card in response to a detected forwarding operation on the second interactive message card.

3. The information display method according to claim 1, wherein the first interactive message card comprises a request control element used to send a data acquisition request, the second interactive message card comprises the request control element; and
   wherein the method further comprises:
   sending the data acquisition request in response to a detected triggering operation on the request control element in the second interactive message card.

4. The information display method according to claim 1, wherein a first device forwards at least two messages, the at least two messages comprise at least one first interactive message card; and
   the displaying the second interactive message card comprises:
   displaying the at least two messages including the first interactive message card.

5. The information display method according to claim 1, wherein a first device forwards the first interactive message card by a forwarding step, the forwarding step comprising:
   displaying the first interactive message card;
   determining, in response to a detected forwarding operation on the first interactive message card, a forwarding target of the forwarding operation; and
   forwarding the first interactive message card to a second device indicated by the forwarding target.

6. The information display method according to claim 1, wherein the first interactive message card received by a first device is generated by a generating step, the generating step comprising:
   establishing an association relationship between a forwarding parameter and the first interactive message card, wherein the forwarding parameter is used to indicate whether the first interactive message card is allowed to be forwarded, and the first device receiving the first interactive message card determines whether the first interactive message card is allowed to be forwarded based on the forwarding parameter.

7. The information display method according to claim 6, wherein in response to determining that the first interactive message card is allowed to be forwarded, a first device evokes a forwarding interactive control element based on a user operation.

8. The information display method according to claim 1, wherein a generating step for generating the first interactive message card comprises:
generating the first interactive message card by a third-party application, wherein the first interactive message card generated by the third-party application is received through a communication application having a message interaction function.

9. The information display method according to claim 8, wherein the generating step comprises:
evoking, in the communication application, a hosted application indicating the third-party application; and
generating the first interactive message card by using the hosted application.

10. The information display method according to claim 9, wherein the generating step comprises:
displaying, in response to evoking the hosted application, the hosted application in a sidebar popping up on an interface of the communication application.

11. The information display method according to claim 8, wherein the generating the first interactive message card by the third-party application comprises:
generating the first interactive message card by calling a card generation interface provided by a server that supports the communication application.

12. An information display apparatus, the apparatus is configured in a second device, the apparatus comprising:
at least one processor; and
at least one memory communicatively coupled to the at least one processor and storing instructions that upon execution by the at least one processor cause the apparatus to:
receive a first interactive message card, wherein the first interactive message card comprises a first data submission control element used to collect user data in response to a user interaction operation and send the collected user data to another device;
generate a second interactive message card according to the first interactive message card, wherein a second data submission control element in the second interactive message card does not have a data collection function; and
wherein the second data submission control element is displayed as disabled mode;
wherein interactive data on the second interactive message card is generated based on user actions on the first interactive message card.

13. A non-transitory computer-readable storage medium storing a computer program, wherein the program, when being executed by a processor, causes the processor to perform the information display method according to claim 1.

14. The apparatus of claim 12, the at least one memory further storing instructions that upon execution by the at least one processor cause the apparatus to: display prompt information in response to a detected triggering operation on the data submission control element in the second interactive message card, wherein the prompt information is used to prompt that the second interactive message card does not have a data submission function; or forward the second interactive message card in response to a detected forwarding operation on the second interactive message card.

15. The apparatus of claim 12, wherein the first interactive message card comprises a request control element used to send a data acquisition request, the second interactive message card comprises the request control element; and
the at least one memory further storing instructions that upon execution by the at least one processor cause the apparatus to:
send the data acquisition request in response to a detected triggering operation on the request control element in the second interactive message card.

16. The apparatus of claim 12, wherein a first device forwards at least two messages, the at least two messages comprise at least one first interactive message card; and
the at least one memory further storing instructions that upon execution by the at least one processor cause the apparatus to:
display the at least two messages including the first interactive message card.

17. The apparatus of claim 12, wherein a first device forwards the first interactive message card by a forwarding step,
the at least one memory further storing instructions that upon execution by the at least one processor cause the apparatus to:
display the first interactive message card;
determine, in response to a detected forwarding operation on the first interactive message card, a forwarding target of the forwarding operation; and
forward the first interactive message card to the second device indicated by the forwarding target.

18. The apparatus of claim 12, wherein the first interactive message card received by a first device is generated by a generating step,
the at least one memory further storing instructions that upon execution by the at least one processor cause the apparatus to:
establish an association relationship between a forwarding parameter and the first interactive message card, wherein the forwarding parameter is used to indicate whether the first interactive message card is allowed to be forwarded, and the first device receiving the first interactive message card determines whether the first interactive message card is allowed to be forwarded based on the forwarding parameter.

19. The apparatus of claim 18, wherein in response to determining that the first interactive message card is allowed to be forwarded, a first device evokes a forwarding interactive control element based on a user operation.

20. The apparatus of claim 12, the at least one memory further storing instructions that upon execution by the at least one processor cause the apparatus to:
generate the first interactive message card by a third-party application, wherein the first interactive message card generated by the third-party application is received through a communication application having a message interaction function;
evoke, in the communication application, a hosted application indicating the third-party application;
generate the first interactive message card by using the hosted application;
display, in response to evoking the hosted application, the hosted application in a sidebar popping up on an interface of the communication application; and
generate the first interactive message card by calling a card generation interface provided by a server that supports the communication application.

* * * * *